United States Patent
Zeilenga et al.

(10) Patent No.: US 10,527,085 B2
(45) Date of Patent: Jan. 7, 2020

(54) SHIM FOR A WORK VEHICLE AXLE ASSEMBLY

(71) Applicant: CNH Industrial America LLC, New Holland, PA (US)

(72) Inventors: Chad K. Zeilenga, Crete, IL (US); Nathaniel J. Repp, Burr Ridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 158 days.

(21) Appl. No.: 15/883,689

(22) Filed: Jan. 30, 2018

(65) Prior Publication Data

US 2019/0234450 A1    Aug. 1, 2019

(51) Int. Cl.
*F16B 43/00*    (2006.01)
*B62D 7/18*    (2006.01)

(52) U.S. Cl.
CPC ....... *F16B 43/005* (2013.01); *B60Y 2200/221* (2013.01); *B62D 7/18* (2013.01)

(58) Field of Classification Search
CPC .... F16B 43/005; F16B 43/009; F16B 43/003; F16B 43/00; F16B 39/24; B60Y 2200/221; B62D 7/18
See application file for complete search history.

(56) References Cited

U.S. PATENT DOCUMENTS

| | | | |
|---|---|---|---|
| 1,894,495 A | 2/1933 | Phelps | |
| 1,931,971 A | 10/1933 | Wallace et al. | |
| 2,772,596 A * | 12/1956 | Trussell | B62D 17/00 411/535 |
| 3,981,513 A * | 9/1976 | Erskine | B62D 7/06 280/93.512 |
| 4,043,567 A * | 8/1977 | Kaiser | B62D 7/18 280/93.512 |
| 4,485,607 A * | 12/1984 | Nelson | E04B 1/2612 52/126.1 |
| 4,558,548 A | 12/1985 | Hieger | |
| 4,635,952 A * | 1/1987 | Smith | B62D 7/18 280/93.512 |

(Continued)

FOREIGN PATENT DOCUMENTS

| | | |
|---|---|---|
| EP | 0984218 | 3/2000 |
| EP | 2963223 | 1/2016 |

(Continued)

*Primary Examiner* — Drew J Brown
(74) *Attorney, Agent, or Firm* — Rebecca L. Henkel; Rickard K. DeMille

(57) ABSTRACT

A shim for a work vehicle axle assembly includes a body having a substantially constant extent along a vertical axis and a first recess extending entirely though the body along the vertical axis. The first recess is configured to receive a shaft of a first fastener extending between a kingpin cap of the work vehicle axle assembly and a spindle, the first recess has a fastener-receiving portion and an inlet portion extending from the fastener-receiving portion of the first recess, a diameter of the fastener-receiving portion of the first recess is configured to be substantially equal to a diameter of the shaft of the first fastener, and a width of the inlet portion of the first recess is configured to be less than the diameter of the shaft of the first fastener.

20 Claims, 4 Drawing Sheets

(56) References Cited

U.S. PATENT DOCUMENTS

| | | | |
|---|---|---|---|
| 4,690,418 A * | 9/1987 | Smith | B62D 7/18 |
| | | | 280/93.512 |
| 4,795,187 A * | 1/1989 | Ingalls | B62D 17/00 |
| | | | 280/86.753 |
| 4,809,421 A * | 3/1989 | Justice | E06B 1/6069 |
| | | | 248/188.2 |
| 4,908,245 A | 3/1990 | Shah et al. | |
| 4,989,310 A * | 2/1991 | Choat | B25B 27/026 |
| | | | 29/252 |
| 4,997,328 A | 3/1991 | Vodila et al. | |
| 5,624,724 A | 4/1997 | Relly | |
| 6,159,575 A | 12/2000 | Rathsack | |
| 6,352,245 B1 | 3/2002 | Norden | |
| 6,616,156 B1 * | 9/2003 | Dudding | B62D 7/18 |
| | | | 280/93.512 |
| 2002/0054810 A1 * | 5/2002 | Lemelin | B23Q 1/01 |
| | | | 411/539 |
| 2004/0150181 A1 * | 8/2004 | Gottschalk | B62D 7/18 |
| | | | 280/93.512 |
| 2004/0262874 A1 * | 12/2004 | Lorente | B62D 7/18 |
| | | | 280/93.512 |
| 2005/0235505 A1 * | 10/2005 | Joseph | G01B 3/34 |
| | | | 33/501.45 |
| 2008/0084042 A1 * | 4/2008 | Dinakaran | B60G 7/008 |
| | | | 280/93.512 |
| 2008/0197596 A1 * | 8/2008 | Heeren | B60G 13/006 |
| | | | 280/124.1 |
| 2010/0140895 A1 * | 6/2010 | Kurth | B62D 7/18 |
| | | | 280/93.512 |
| 2012/0093611 A1 * | 4/2012 | Knight, Jr. | F16B 43/005 |
| | | | 411/368 |
| 2016/0069381 A1 * | 3/2016 | Antonucci | H02G 3/10 |
| | | | 411/547 |
| 2016/0081259 A1 | 3/2016 | Bonte et al. | |
| 2018/0304867 A1 * | 10/2018 | Chirrey | B60S 5/00 |
| 2019/0211878 A1 * | 7/2019 | Heuberger | F16B 43/005 |

FOREIGN PATENT DOCUMENTS

| | | |
|---|---|---|
| EP | 2078800 | 4/2016 |
| NL | 9300161 | 8/1994 |

* cited by examiner

SHIM FOR A WORK VEHICLE AXLE ASSEMBLY

BACKGROUND

The disclosure relates generally to a shim for a work vehicle axle assembly.

Work vehicles (e.g., tractors, harvesters, sprayers, etc.) typically include a drive shaft configured to transfer rotational motion from an engine to wheels of the work vehicle. The drive shaft typically extends from the engine, a transmission, or a transfer case to a differential (e.g., locking differential, limited slip differential, etc.) of an axle assembly. Axles of the axle assembly extend from the differential to respective gear assemblies configured to transfer the rotational motion of the axles to rotational motion of respective wheel hubs. Accordingly, wheels coupled to the wheels hubs may be driven to rotate by the engine of the work vehicle.

In certain work vehicles, the axles are disposed within an axle housing of the axle assembly, and the wheel hubs are rotatably coupled to the axle housing by respective spindles (e.g., spindle housings). For example, each spindle may be rotatably coupled to an end of the axle housing by a respective kingpin. Vertical alignment of each spindle with respect to the axle housing facilitates effective engagement of components of the gear assembly. In certain configurations, the vertical position of each spindle relative to the axle housing may be controlled by adjusting the position of the spindle relative to a kingpin cap, which is coupled to the axle housing. For example, one or more shims may be selectively positioned between the kingpin cap and the spindle to adjust the vertical position of the spindle, thereby facilitating effective engagement of the components of the gear assembly. Unfortunately, during operation of the work vehicle, the shim(s) may become dislodged from the kingpin cap (e.g., due to flexing of the axle housing), thereby reducing the effectiveness of the engagement of the gear assembly components.

BRIEF DESCRIPTION

In one embodiment, a shim for a work vehicle axle assembly includes a body having a substantially constant extent along a vertical axis and a first recess extending entirely though the body along the vertical axis. The first recess is configured to receive a shaft of a first fastener extending between a kingpin cap of the work vehicle axle assembly and a spindle, the first recess has a fastener-receiving portion and an inlet portion extending from the fastener-receiving portion of the first recess, a diameter of the fastener-receiving portion of the first recess is configured to be substantially equal to a diameter of the shaft of the first fastener, and a width of the inlet portion of the first recess is configured to be less than the diameter of the shaft of the first fastener.

In another embodiment, a shim for a work vehicle axle assembly includes a body having a first recess. The first recess is configured to receive a shaft of a first fastener extending between a kingpin cap of the work vehicle axle assembly and a spindle, the first recess has a fastener-receiving portion and an inlet portion extending from the fastener-receiving portion of the first recess, a diameter of the fastener-receiving portion of the first recess is configured to be substantially equal to a diameter of the shaft of the first fastener, and a width of the inlet portion of the first recess is configured to be less than the diameter of the shaft of the first fastener. In addition, the inlet portion of the first recess has a substantially flat side and an arcuate side, and a distance between the substantially flat side of the inlet portion of the first recess and a peak of the arcuate side of the inlet portion of the first recess establishes the width of the inlet portion of the first recess.

In a further embodiment, a shim for a work vehicle axle assembly includes a body having a first recess and a second recess. The first recess is configured to receive a shaft of a first fastener extending between a kingpin cap of the work vehicle axle assembly and a spindle, the first recess has a fastener-receiving portion and an inlet portion extending from the fastener-receiving portion of the first recess, and a diameter of the fastener-receiving portion of the first recess is configured to be substantially equal to a diameter of the shaft of the first fastener. In addition, the second recess is configured to receive a shaft of a second fastener extending between the kingpin cap of the work vehicle axle assembly and the spindle, the second recess has a fastener-receiving portion and an inlet portion extending from the fastener-receiving portion of the second recess, a diameter of the fastener-receiving portion of the second recess is configured to be substantially equal to a diameter of the shaft of the second fastener, and a width of the inlet portion of the second recess is configured to be less than the diameter of the shaft of the second fastener. Furthermore, an inlet axis of the inlet portion of the first recess is angled relative to an inlet axis of the inlet portion of the second recess.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
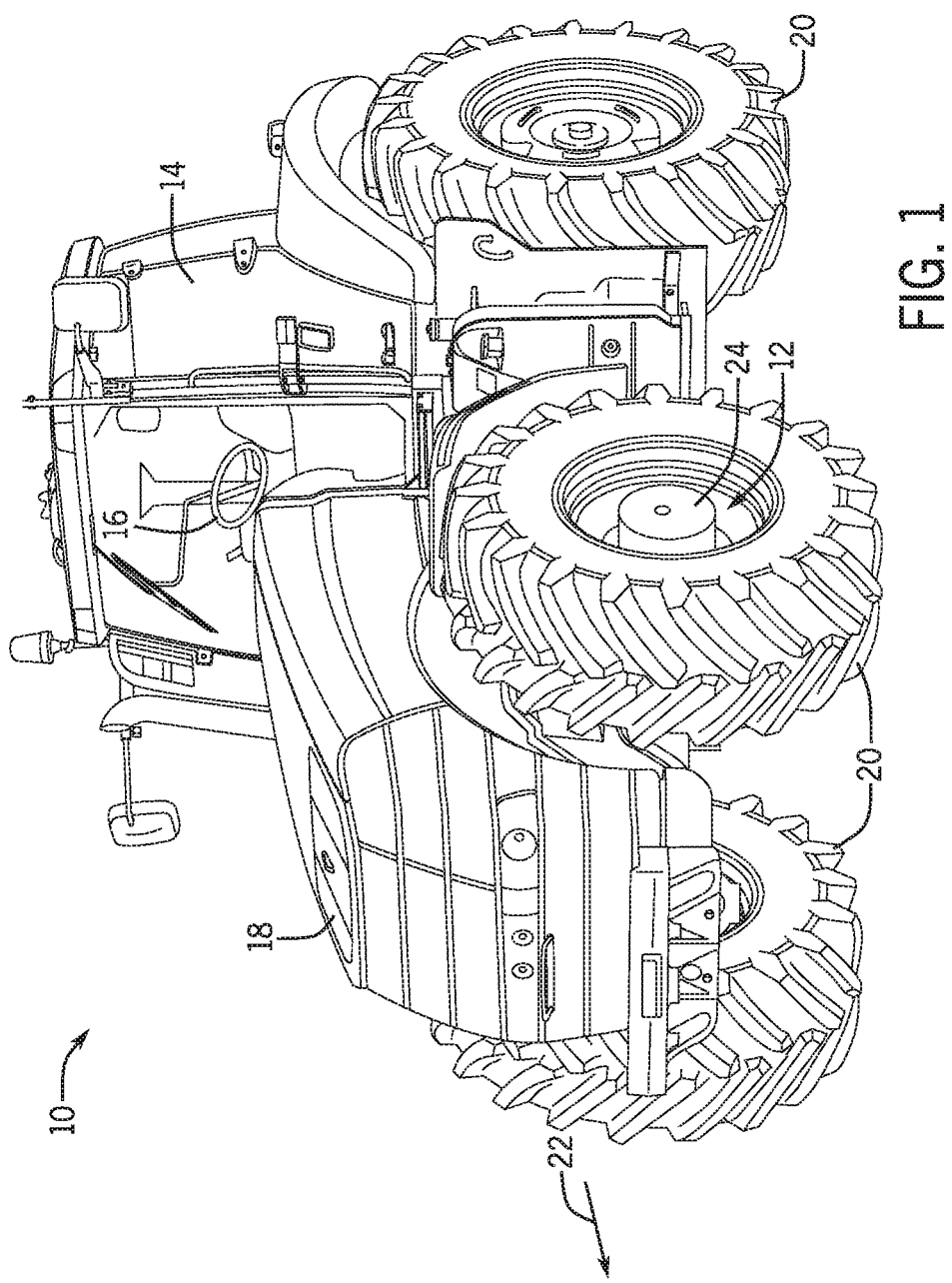
FIG. 1 is a perspective view of an embodiment of a work vehicle that includes an axle assembly.

FIG. 1 is a perspective view of an embodiment of a work vehicle 10 that includes an axle assembly 12. In the illustrated embodiment, the work vehicle 10 includes a cab 14 configured to house an operator. A steering wheel 16 is disposed within the cab 14 to facilitate control of the work vehicle 10. The cab may also house additional controls to enable the operator to control various functions of the work vehicle (e.g., movement of a tool coupled to the work vehicle, speed of the work vehicle, etc.). In the illustrated embodiment, the work vehicle 10 includes a body 18 configured to house an engine, a transmission, other systems of the work vehicle 10, or a combination thereof. In addition, the work vehicle 10 includes wheels 20 configured to be driven by the engine, thereby driving the work vehicle 10 along a field, a road, or any other suitable surface in a direction of travel 22. While the work vehicle 10 is a tractor in the illustrated embodiment, in other embodiments, the work vehicle may be a harvester, a sprayer, or any other suitable type of work vehicle.

In certain embodiments, the work vehicle 10 includes a drive shaft configured to transfer rotational motion from the engine to the wheels 20 of the work vehicle 10. The drive shaft extends from the engine, the transmission, or a transfer case to a differential (e.g., locking differential, limited slip differential, etc.) of the axle assembly 12. Axles of the axle assembly 12 extend from the differential to respective gear assemblies configured to transfer the rotational motion of the axles to rotational motion of respective wheel hubs 24. Accordingly, the wheels 20, which are coupled to the respective wheel hubs 24, are driven to rotate by the engine of the work vehicle 10.

As discussed in detail below, the axles are disposed within an axle housing of the axle assembly 12, and the wheel hubs 24 are rotatably coupled to the axle housing by respective spindles (e.g., spindle housings). In certain embodiments, each spindle is rotatably coupled to an end of the axle housing by a respective kingpin. Vertical alignment of each spindle with respect to the axle housing facilitates effective engagement of components of the gear assembly. The vertical position of each spindle relative to the axle housing is controlled by adjusting the position of the spindle relative to a kingpin cap, which is coupled to the axle housing. As discussed in detail below, one or more shims may be selectively positioned between the kingpin cap and the spindle to adjust the vertical position of the spindle, thereby facilitating effective engagement of the components of the gear assembly.

In certain embodiments, at least one shim includes a body having a recess extending entirely through the body along a vertical axis. The recess is configured to receive a shaft of a fastener extending between the kingpin cap of the axle assembly and the spindle. The recess has a fastener-receiving portion and an inlet portion extending from the fastener-receiving portion. In addition, a diameter of the fastener-receiving portion is configured to be substantially equal to a diameter of the shaft of the fastener, and a width of the inlet portion is configured to be less than the diameter of the shaft of the fastener. Because the width of the inlet portion is less than the diameter of the shaft, the fastener shaft is captured within the fastener-receiving portion, thereby substantially reducing or eliminating the possibility of the shim becoming dislodged from the kingpin cap during operation of the work vehicle (e.g., due to flexing of the axle housing). Accordingly, the effective engagement of the components of the gear assembly may be substantially maintained during operation of the work vehicle, which may substantially increase the operational life of the gear assembly components. While the shims are disclosed herein with reference to the illustrated front axle assembly 12, in certain embodiments, one or more shims, such as the shims disclosed herein, may be utilized within a rear axle assembly and/or an intermediate axle assembly.

Figure 2:
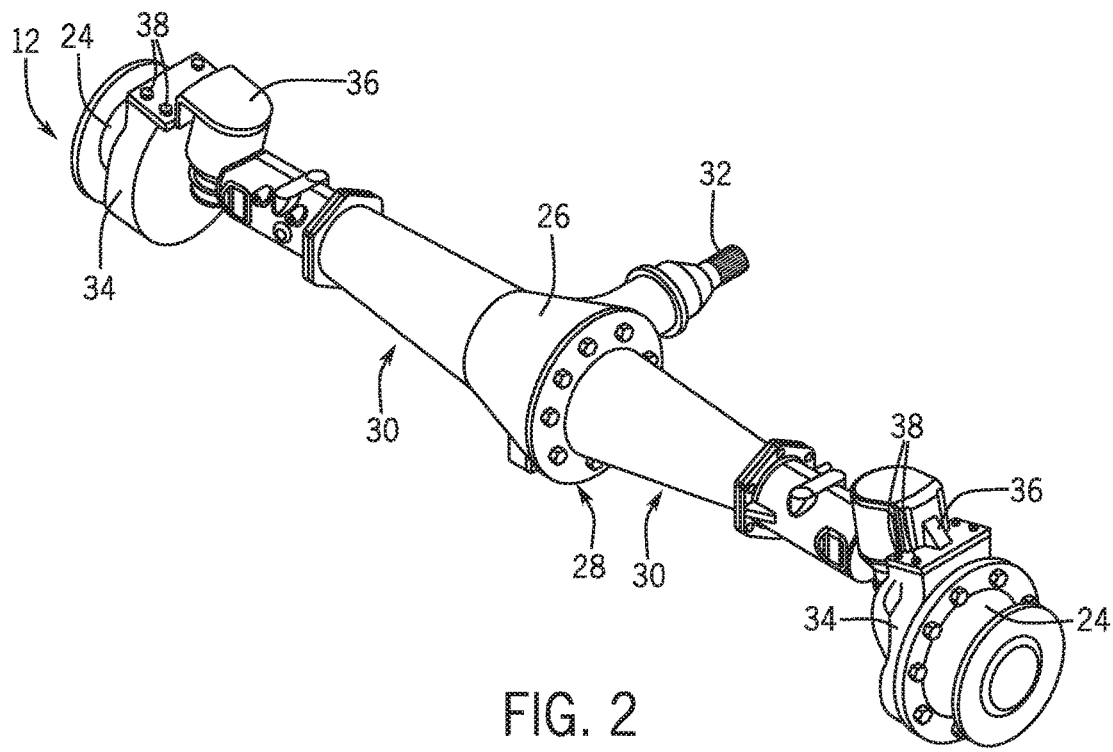
FIG. 2 is a perspective view of an embodiment of an axle assembly that may be employed within the work vehicle of FIG. 1.

FIG. 2 is a perspective view of an embodiment of an axle assembly 12 that may be employed within the work vehicle of FIG. 1. In the illustrated embodiment, the axle assembly 12 includes a housing 26 configured to house a differential (e.g., a locking differential, a limited slip differential, etc.) within a central portion 28 and axles within lateral portions 30. The axle assembly 12 also includes a spline 32 configured to couple to a drive shaft of the work vehicle. A first end of the drive shaft may be coupled to the engine, the transmission, or the transfer case of the work vehicle, and a second end of the drive shaft may be coupled to the spline 32. The spline 32 is coupled to the differential, and the differential is coupled to the axles. As the drive shaft is driven to rotate by the engine, the drive shaft drives gears in the differential to rotate, thereby driving the axles to rotate. The housing 26 is configured to support the differential and the axles, thereby enabling the differential gears and the axles to rotate. While the drive shaft is coupled to the differential by the spline 32 in the illustrated embodiment, in other embodiments, the drive shaft may be coupled to the differential by any other suitable connector (e.g., shaft having pin, joint, etc.).

Each axle extends from the differential to a respective gear assembly. Each gear assembly is configured to transfer the rotational motion of the respective axle to the respective wheel hub 24. As illustrated, each wheel hub 24 is rotatably coupled to the axle housing 26 by a respective spindle (e.g., spindle housing) 34. Each gear assembly is partially housed within the axle housing 26 and partially housed within the respective spindle 34. In the illustrated embodiment, the axle housing 26 and the spindles 34 are configured to position the wheel hubs 24 below the axles, thereby increasing the clearance between the axle housing 26 and the ground.

Each spindle 34 is rotatably coupled to the axle housing 26 by a respective kingpin. As previously discussed, vertical alignment of each spindle 34 with respect to the axle housing 26 facilitates effective engagement of the components of the gear assembly. For example, the gear assembly may include one or more components, such as gear(s), spline(s), and/or pinion(s), that include teeth. Effectively aligning the spindle 34 with respect to the axle housing 26 facilitates effective engagement of the teeth of one component with the teeth of another component, thereby increasing the operational life of the components. In the illustrated embodiment, the vertical position of each spindle 34 relative to the axle housing 26 is controlled by adjusting the position of the spindle 34 relative to a respective kingpin cap 36, which is part of the axle assembly 12 and coupled to the axle housing 26. As discussed in detail below, one or more shims may be selectively positioned between the kingpin cap 36 and the spindle 34 to adjust the position of the spindle 34, thereby facilitating effective engagement of the components of the gear assembly. As illustrated, the kingpin cap 36 is coupled to the spindle 34 by fasteners 38. In certain embodiments, the shims include recesses that receive the fasteners while the shims are positioned between the kingpin cap 36 and the spindle 34.

Figure 3:
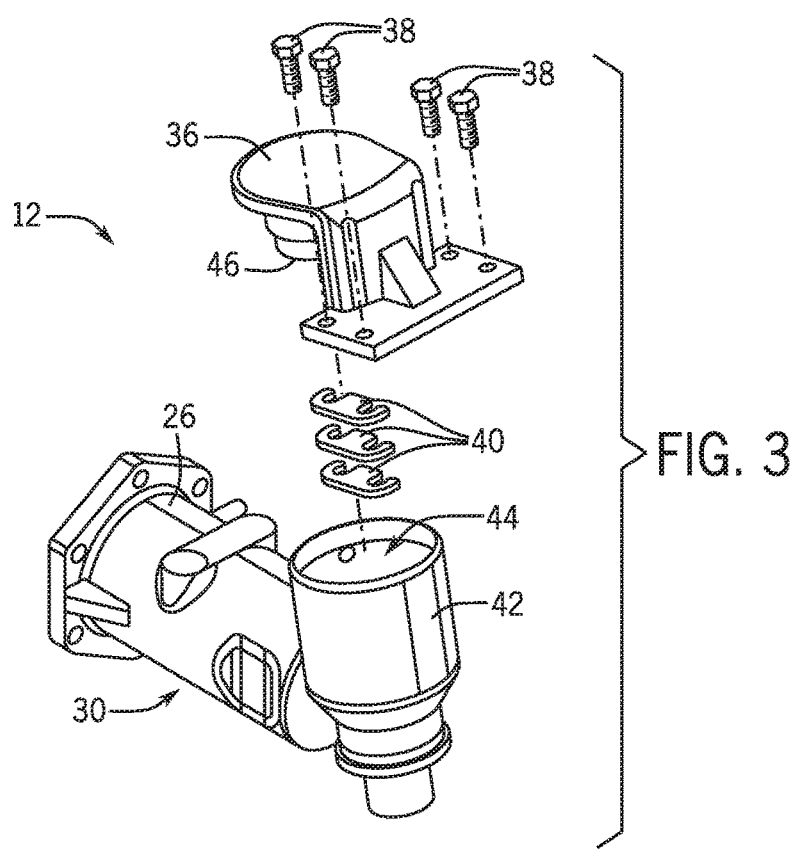
FIG. 3 is an exploded view of a portion of the axle assembly of FIG. 2, including shims configured to be positioned between a kingpin cap and a spindle.

FIG. 3 is an exploded view of a portion of the axle assembly 12 of FIG. 2, including shims 40 configured to be positioned between the kingpin cap 36 and the spindle. As illustrated, the axle housing 26 includes a substantially vertical portion 42 at the end of the lateral portion 30. The substantially vertical portion 42 of the axle housing 26 includes an opening 44 configured to receive the kingpin. In addition, a protrusion 46 of the kingpin cap 36 is configured to engage the kingpin. The protrusion 46 of the kingpin cap 36 is also configured to engage the opening 44, thereby facilitating coupling the kingpin cap 36 to the axle housing 26 (e.g., via a pin that engages the kingpin cap and the axle housing). Accordingly, while the kingpin cap 36 is coupled to the axle housing 26, and the kingpin cap 36 is coupled to the spindle by the fasteners 38, the kingpin is secured within the substantially vertical portion 42 of the axle housing 26, thereby facilitating rotation of the spindle relative to the axle housing 26.

As previously discussed, one or more shims 40 may be positioned between the kingpin cap 36 and the spindle to control the position of the spindle relative to the axle housing 26. Increasing the number of shims 40 moves the spindle downward relative to the axle housing 26, and decreasing the number of shims 40 moves the spindle upward relative to the axle housing 26. While three shims 40 are positioned between the kingpin cap 36 and the spindle in the illustrated embodiment, other embodiments may include any suitable number of shims (e.g., 0, 1, 2, 3, 4, 5, 6, or more) to vertically align the spindle with respect to the axle housing 26, thereby facilitating effective engagement of the components of the gear assembly. In the illustrated embodiment, each shim has the same thickness (e.g., extent along a vertical axis). However, in other embodiments, certain shims may be thicker than others, and a desired vertical spacing between the kingpin cap 36 and the spindle may be achieved by selecting one or more shims having selected thickness(es). Furthermore, while the illustrated shims are positioned on one side of the kingpin cap, in other embodiments, one or more shims may be positioned on another suitable side of the kingpin cap (e.g., in addition to or as an alternative to the illustrated shims). In addition, while the shims are employed within the axle assembly disclosed above with reference to FIGS. 2 and 3, the shims disclosed herein may be employed within (e.g., disposed between the spindle and the kingpin cap of) an axle assembly having any other suitable configuration.

Figure 4:
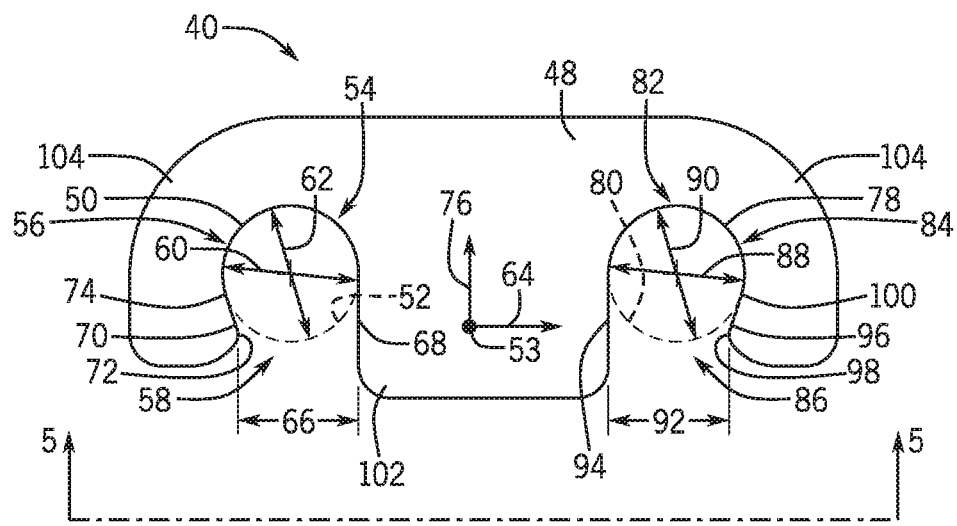
FIG. 4 is a top view of an embodiment of a shim that may be employed within the axle assembly of FIG. 2.

FIG. 4 is a top view of an embodiment of a shim 40 that may be employed within the axle assembly of FIG. 2. In the illustrated embodiment, the shim 40 includes a body 48 having a first recess 50 extending entirely through the body 48 along a vertical axis 53. The first recess 50 is configured to receive a shaft 52 of a first fastener 54 (e.g., one of the fasteners 38 of FIGS. 2-3) extending between the kingpin cap and the spindle. As illustrated, the first recess 50 has a fastener-receiving portion 56 and an inlet portion 58 extending from the fastener-receiving portion 56. A diameter 60 of the fastener-receiving portion 56 is substantially equal to a diameter 62 of the shaft 52 of the first fastener 54. For example, the difference between the diameter 60 of the fastener-receiving portion 56 and the diameter 62 of the shaft 52 may be less than 5 mm, less than 3 mm, less than 1 mm, or less than any other suitable tolerance. Accordingly, movement of the shim 40 (e.g., along a lateral axis 64) is substantially blocked by contact between the body 48 and the shaft 52. In addition, a width 66 of the inlet portion 58 of the first recess 50 is less than the diameter 62 of the shaft 52 of the first fastener 54. Accordingly, the fastener shaft 52 is captured within the fastener-receiving portion 56, thereby substantially reducing or eliminating the possibility of the shim becoming dislodged from the kingpin cap during operation of the work vehicle (e.g., due to flexing of the axle housing). As a result, the effective engagement of the components of the gear assembly may be substantially maintained during operation of the work vehicle, which may substantially increase the operational life of the gear assembly components.

In the illustrated embodiment, the inlet portion 58 of the first recess 50 has a substantially flat side 68 and an arcuate side 70. A distance between the substantially flat side 68 and a peak 72 of the arcuate side 70 of the inlet portion 58 establishes the width 66 of the inlet portion 58. Furthermore, in the illustrated embodiment, a curvature of a segment 74 of the arcuate side 70 of the inlet portion 58 substantially matches a curvature of the fastener-receiving portion 56 of the first recess 50. Accordingly, movement of the shim 40 relative to the first fastener 54 (e.g., along the lateral axis 64 and/or along a longitudinal axis 76) is substantially blocked. While the illustrated inlet portion has a substantially flat side and an arcuate side, in other embodiments, the inlet portion may include two arcuate sides, one or more angled sides, or any other suitable configuration that establishing a width 66 less than the diameter 62 of the shaft 52 of the first fastener 54.

In the illustrated embodiment, the body 48 of the shim 40 has a second recess 78 extending entirely through the body 48 along the vertical axis 53. The second recess 78 is configured to receive a shaft 80 of a second fastener 82 (e.g., one of the fasteners 38 of FIGS. 2-3) extending between the kingpin cap and the spindle. As illustrated, the second recess 78 has a fastener-receiving portion 84 and an inlet portion 86 extending from the fastener-receiving portion 84. A diameter 88 of the fastener-receiving portion 84 is substantially equal to a diameter 90 of the shaft 80 of the second fastener 82. For example, the difference between the diameter 88 of the fastener-receiving portion 84 and the diameter 90 of the shaft 80 may be less than 5 mm, less than 3 mm, less than 1 mm, or less than any other suitable tolerance. Accordingly, movement of the shim 40 (e.g., along the lateral axis 64) is substantially blocked by contact between the body 48 and the shaft 80. In addition, a width 92 of the inlet portion 86 of the second recess 78 is less than the diameter 90 of the shaft 80 of the second fastener 82. Accordingly, the fastener shaft 80 is captured within the fastener-receiving portion 84, thereby substantially reducing or eliminating the possibility of the shim becoming dislodged from the kingpin cap during operation of the work vehicle (e.g., due to flexing of the axle housing). As a result, the effective engagement of the components of the gear assembly may be substantially maintained during operation of the work vehicle, which may substantially increase the operational life of the gear assembly components.

In the illustrated embodiment, the inlet portion 86 of the second recess 78 has a substantially flat side 94 and an arcuate side 96. A distance between the substantially flat side 94 and a peak 98 of the arcuate side 96 of the inlet portion 86 establishes the width 92 of the inlet portion 86. Furthermore, in the illustrated embodiment, a curvature of a segment 100 of the arcuate side 96 of the inlet portion 86 substantially matches a curvature of the fastener-receiving portion 84 of the second recess 78. Accordingly, movement of the shim 40 relative to the second fastener 82 (e.g., along the lateral axis 64 and/or along the longitudinal axis 76) is substantially blocked. While the illustrated inlet portion has a substantially flat side and an arcuate side, in other embodiments, the inlet portion may include two arcuate sides, one or more angles sides, or any other suitable configuration that establishing a width 86 less than the diameter 90 of the shaft 80 of the second fastener 82.

Furthermore, in the illustrated embodiment, the arcuate side 70 of the inlet portion 58 of the first recess 50 is positioned laterally outward from the substantially flat side 68 of the inlet portion 58 of the first recess 50. In addition, the arcuate side 96 of the inlet portion 86 of the second recess 78 is positioned laterally outward from the substantially flat side 94 of the inlet portion 86 of the second recess 78. However, in alternative embodiments, the arcuate side of at least one inlet portion may be positioned laterally inward from the respective substantially flat side.

While the shafts of the fasteners in the illustrated embodiment have substantially circular cross-sections, in other embodiments, the shaft of at least one fastener may have another suitable cross-sectional shape, such as polygonal or elliptical. In such embodiments, the fastener-receiving portion of the recess that receives the fastener may have a corresponding shape. Furthermore, in such embodiments, the "diameter" of the fastener shaft and the corresponding fastener-receiving portion refers to the maximum width (e.g., along the lateral axis) of the shaft/recess. While the shim 40 includes two recess in the illustrated embodiment, in other embodiments the shim may include more or fewer recesses, such as 1, 2, 3, 4, 5, 6, or more recesses (e.g., corresponding to the number of fasteners on a side of the kingpin cap/spindle). In addition, while each recess in the illustrated embodiment includes an inlet portion having a width less than the diameter of the respective fastener shaft, in other embodiments, at least one recess may have an inlet portion with a width greater than or equal to the diameter of the respective fastener shaft.

In the illustrated embodiment, the body 48 of the shim 40 has a center portion 102 and lateral portions 104. As illustrated, the recesses are formed between the center portion 102 and the lateral portions 104. While a longitudinal extent of the center portion 102 (e.g., extent of the center portion 102 along the longitudinal axis 76) is greater than the longitudinal extent of the lateral portions 104 (e.g., extent of the lateral portions 104 along the longitudinal axis 76) in the illustrated embodiment, in other embodiments, the longitudinal extent of the center portion may be less than or equal to the longitudinal extent of the lateral portions. Furthermore, while the illustrated shim body 48 has curved corners, in other embodiments, corners of the body may be square, polygonal, or any other suitable shape.

To couple the shim 40 to the fasteners, the inlet portion 58 of the first recess 50 is aligned with the shaft 52 of the first fastener 54. The shim 40 is then translated toward the first fastener 54 with sufficient force to cause the fastener-receiving portion 56 of the first recess 50 to engage the shaft 52 of the first fastener 54. The shim is then rotated about the shaft 52 of the first fastener 54 toward the second fastener 82 with sufficient force to cause the fastener-receiving portion 84 of the second recess 78 to engage the shaft 80 of the second fastener 82. The shim may also be coupled to the fasteners by translating the shim such that the second fastener engages the second recess, and then rotating the shim such that the first fastener engages the first recess. Furthermore, the first and second recesses may be engaged with the first and second fasteners substantially concurrently (e.g., by translating the shim toward the first and second fasteners). Once a desired number of shims are coupled to the fasteners (e.g., to facilitate effective engagement of the components of the gear assembly), the fasteners may be engaged (e.g., by tightening the fasteners, by tightening bolts engaged with the fasteners, by pinning the fasteners, etc.), thereby compressing the shim(s) and coupling the kingpin cap to the spindle. With the shim(s) compressed between the kingpin cap and the spindle, movement of the shim(s) along the vertical axis 53 is substantially blocked.

To remove the shim 40 from the fasteners, the fasteners are disengaged (e.g., loosened) to reduce the compression of the shim body 48. Next, the shim 40 is rotated about the shaft 52 of the first fastener 54 away from the second fastener 82 with sufficient force to cause the fastener-receiving portion 84 of the second recess 78 to disengage the shaft 80 of the second fastener 82. The shim 40 is then translated away from the first fastener 54 with sufficient force to cause the fastener-receiving portion 56 of the first recess 50 to disengage the shaft 52 of the first fastener 54. The shim may also be removed from the fasteners by rotating the shim such that the first recess disengages the first fastener, and then translating the shim such that the second recess disengages the second fastener. Furthermore, the first and second recesses may be disengaged from the first and second fasteners substantially concurrently (e.g., by translating the shim away from the first and second fasteners).

Figure 5:
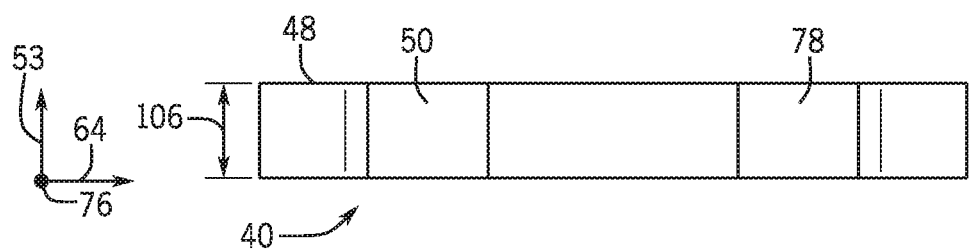
FIG. 5 is a front view of the shim of FIG. 4, taken along line 5-5 of FIG. 4.

FIG. 5 is a front view of the shim 40 of FIG. 4, taken along line 5-5 of FIG. 4. In the illustrated embodiment, the vertical extent 106 (e.g., height) of the body 48 of the shim 40 is substantially constant (e.g., across the entire extent of the body 48 along the lateral axis 64 and across the entire extent of the body 48 along the longitudinal axis 76). As used herein, "substantially constant" refers to a difference in vertical extent of less than 1 mm, less than 0.5 mm, less than 0.3 mm, less than 0.1 mm, or less than 0.05 mm across the lateral and/or longitudinal extents of the body 48 of the shim 40. However, in alternative embodiments, the vertical extent of the body may vary (e.g., along the longitudinal extent and/or along the lateral extent of the shim body).

Figure 6:
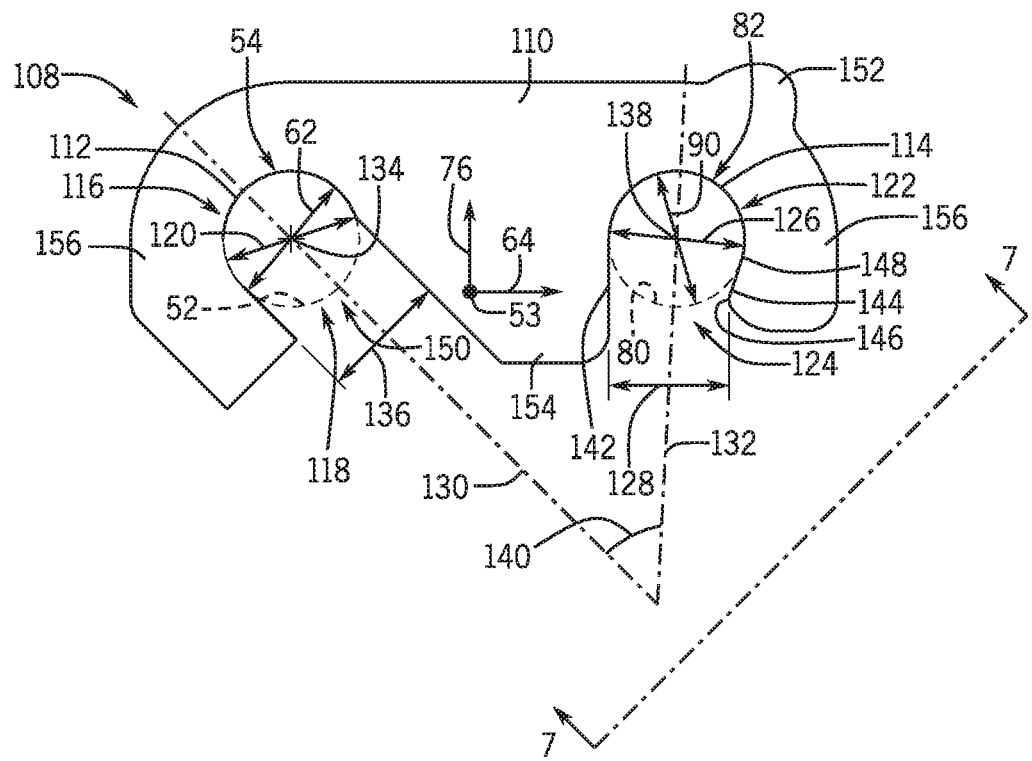
FIG. 6 is a top view of another embodiment of a shim that may be employed within the axle assembly of FIG. 2.

FIG. 6 is a top view of another embodiment of a shim 108 that may be employed within the axle assembly of FIG. 2. In the illustrated embodiment, the shim 108 includes a body 110 having a first recess 112 and a second recess 114. The first recess 112 is configured to receive the shaft 52 of the first fastener 54 (e.g., one of the fasteners 38 of FIGS. 2-3) extending between the kingpin cap and the spindle. As illustrated, the first recess 112 has a fastener-receiving portion 116 and an inlet portion 118 extending from the fastener-receiving portion 116. A diameter 120 of the fastener-receiving portion 116 is substantially equal to the diameter 62 of the shaft 52 of the first fastener 54. For example, the difference between the diameter 120 of the fastener-receiving portion 116 and the diameter 62 of the shaft 52 may be less than 5 mm, less than 3 mm, less than 1 mm, or less than any other suitable tolerance. Accordingly, movement of the shim 108 (e.g., along the lateral axis 64) is substantially blocked by contact between the body 110 and the shaft 52.

In the illustrated embodiment, the second recess 114 is configured to receive the shaft 80 of the second fastener 82 extending between the kingpin cap and the spindle. As illustrated, the second recess 114 has a fastener-receiving portion 122 and an inlet portion 124 extending from the fastener-receiving portion 122. A diameter 126 of the fastener-receiving portion 122 is substantially equal to a diameter 90 of the shaft 80 of the second fastener 82. For example, the difference between the diameter 126 of the fastener-receiving portion 122 and the diameter 90 of the shaft 80 may be less than 5 mm, less than 3 mm, less than 1 mm, or less than any other suitable tolerance. Accordingly, movement of the shim 108 (e.g., along the lateral axis 64) is substantially blocked by contact between the body 110 and the shaft 80. In addition, a width 128 of the inlet portion 124 of the second recess 114 is less than the diameter 90 of the shaft 80 of the second fastener 82. Accordingly, the fastener shaft 80 is captured within the fastener-receiving portion 122.

In the illustrated embodiment, a first inlet axis 130 of the inlet portion 118 of the first recess 112 is angled relative to a second inlet axis 132 of the inlet portion 124 of the second recess 114. As illustrated, the first inlet axis 130 extends through a center point 134 of the fastener-receiving portion 116 of the first recess 112, which corresponds to a center point of the shaft 52 of the first fastener 54, and bisects a width 136 of the inlet portion 118 of the first recess 112. In addition, the second inlet axis 132 extends through a center point 138 of the fastener-receiving portion 122 of the second recess 114, which corresponds to a center point of the shaft 80 of the second fastener 82, and bisects the width 128 of the inlet portion 124 of the second recess 114. The first inlet axis 130 intersects the second inlet axis 132 at an angle 140. The angle 140 may be between about 1 degree and about 89 degrees, between about 5 degrees and about 85 degrees, between about 10 degrees and about 80 degrees, between about 20 degrees and about 70 degrees, between about 30 degrees and about 60 degrees, or between about 40 degrees and about 50 degrees. Furthermore, in the illustrated embodiment, the second inlet axis 132 is substantially parallel to the longitudinal axis 76 of the shim 108/body 110. However, in alternative embodiments, the second inlet axis 132 may be angled relative to the longitudinal axis 76 (e.g., by more than 5 degrees, by more than 15 degrees, by more than 30 degrees, by more than 45 degrees, by more than 60 degrees, etc.)

In certain embodiments, to couple the shim 108 to the fasteners, the inlet portion 118 of the first recess 112 is aligned with the shaft 52 of the first fastener 54. The shim 108 is then translated along the first inlet axis 130 until the shaft 52 of the first fastener 54 is disposed within the fastener-receiving portion 116 of the first recess 112. The shim 108 is then rotated about the shaft 52 of the first fastener 54 until the shaft 80 of the second fastener 82 is captured within the fastener-receiving portion 122 of the second recess 114. With the shim 108 in the illustrated engaged position, movement of the shim 108 along the lateral axis 64 relative to the fasteners is substantially blocked by contact between the body 110 at the fastener-receiving portion 116 of the first recess 112 and the shaft 52 of the first fastener 54, and by contact between the body 110 at the fastener-receiving portion 122 of the second recess 114 and the shaft 80 of the second fastener 84. In addition, movement of the shim 108 along the longitudinal axis 76 is substantially blocked by contact between the body 110 at the inlet portion 118 of the first recess 112 and the shaft 52 of the first fastener 54, by contact between the body 110 at the fastener-receiving portion 116 of the first recess 112 and the shaft 52 of the first fastener 54, by contact between the body 110 at the inlet portion 124 of the second recess 114 and the shaft 80 of the second fastener 82, and by contact between the body 110 at the fastener-receiving portion 122 of the second recess 114 and the shaft 80 of the second fastener 82. Because movement of the shim 108 is substantially blocked along the lateral and longitudinal axes relative to the fasteners, the possibility of the shim becoming dislodged from the kingpin cap during operation of the work vehicle (e.g., due to flexing of the axle housing) is substantially reduced or eliminated. As a result, the effective engagement of the components of the gear assembly may be substantially maintained during operation of the work vehicle, which may substantially increase the operational life of the gear assembly components.

In the illustrated embodiment, the inlet portion 124 of the second recess 114 has a substantially flat side 142 and an arcuate side 144. A distance between the substantially flat side 142 and a peak 146 of the arcuate side 144 of the inlet portion 124 establishes the width 128 of the inlet portion 124. Furthermore, in the illustrated embodiment, a curvature of a segment 148 of the arcuate side 144 of the inlet portion 124 substantially matches a curvature of the fastener-receiving portion 122 of the second recess 114. Accordingly, movement of the shim 108 relative to the second fastener 82 (e.g., along the lateral axis 64 and/or along the longitudinal axis 76) is substantially blocked. While the illustrated inlet portion has a substantially flat side and an arcuate side, in other embodiments, the inlet portion may include two arcuate sides, one or more angles sides, or any other suitable configuration that establishing a width 128 less than the diameter 90 of the shaft 80 of the second fastener 82.

Furthermore, in the illustrated embodiment, the arcuate side 144 of the inlet portion 124 of the second recess 114 is positioned laterally outward from the substantially flat side 142 of the inlet portion 124 of the second recess 114. However, in alternative embodiments, the arcuate side of the inlet portion of the second recess may be positioned laterally inward from the substantially flat side. In the illustrated embodiment, an opening 150 to the inlet portion 118 of the first recess 112 is positioned closer to the second recess 114 than the fastener-receiving portion 116 of the first recess 112 along the lateral axis 64. However, in alternative embodiments, the opening to the inlet portion of the first recess may be positioned farther from the second recess that the fastener-receiving portion of the first recess along the lateral axis.

In the illustrated embodiment, the body 110 has a tab 152 positioned closer to the second recess 114 than the first recess 112. The tab 152 is configured to facilitate removal of the shim 108 from the first and second fasteners. For example, a technician may disengage (e.g., loosen) the fasteners to reduce compression of the body 110 along the vertical axis 53. The technician may than grasp the tab 152 and rotate the shim 108 about the shaft 52 of the first fastener 54 away from the second fastener 82 with sufficient force to cause the fastener-receiving portion 122 of the second recess 114 to disengage the shaft 80 of the second fastener 82. The shim 108 may then be translated along the first inlet axis 130 away from the first fastener 54, thereby disengaging the shim 108 from the fasteners. While the illustrated tab 152 is positioned closer to the second recess 114 than the first recess 112, in alternative embodiments, the tab may be located at another suitable portion of the body. In addition, while the illustrated body 110 has a single tab 152, in alternative embodiments, the body may include more or fewer tabs (e.g., 0, 1, 2, 3, 4, or more). Furthermore, while the body of the shim 40 disclosed above with reference to FIGS. 4 and 5 does not include a tab, in certain embodiments, the body of the shim 40 may include one or more tabs.

While the shafts of the fasteners in the illustrated embodiment have substantially circular cross-sections, in other embodiments, the shaft of at least one fastener may have another suitable cross-sectional shape, such as polygonal or elliptical. In such embodiments, the fastener-receiving portion of the recess that receives the fastener may have a corresponding shape. Furthermore, in such embodiments, the "diameter" of the fastener shaft and the corresponding fastener-receiving portion refers to the maximum width (e.g., along the lateral axis) of the shaft/recess. While the shim 108 includes two recesses in the illustrated embodiment, in other embodiments the shim may include more recesses, such as 2, 3, 4, 5, 6, or more recesses (e.g., corresponding to the number of fasteners on a side of the kingpin cap/spindle). For example, at least one of the additional recess(es) may have a configuration substantially similar to the configuration of the illustrated second recess, and/or at least one of the additional recess(es) may have an inlet portion with a width greater than or equal to the diameter of the respective fastener shaft.

In the illustrated embodiment, the body 110 of the shim 108 has a center portion 154 and lateral portions 156. As illustrated, the recesses are formed between the center portion 154 and the lateral portions 156. While a longitudinal extent of the center portion 154 (e.g., extent of the center portion 154 along the longitudinal axis 76) is greater than the longitudinal extent of the lateral portion 156 proximate to the second recess 114 and less than the longitudinal extent of the lateral portion 156 proximate to the first recess 112 (e.g., extent of the lateral portions 156 along the longitudinal axis 76) in the illustrated embodiment, in other embodiments, the center portion and each lateral portion may have any other suitable longitudinal extent. Furthermore, while the illustrated shim body 110 has curved corners and angular corners, in other embodiments, the corners of the body may have any other suitable shape.

Figure 7:
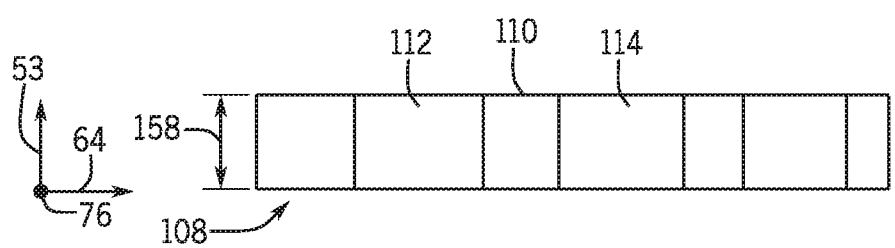
FIG. 7 is a front view of the shim of FIG. 6, taken along line 7-7 of FIG. 6.

FIG. 7 is a front view of the shim 108 of FIG. 6, taken along line 7-7 of FIG. 6. In the illustrated embodiment, the vertical extent 158 (e.g., height) of the body 110 of the shim 108 is substantially constant (e.g., across the entire extent of the body 110 along the lateral axis 64 and across the entire extent of the body 110 along the longitudinal axis 76). As used herein, "substantially constant" refers to a difference in vertical extent of less than 1 mm, less than 0.5 mm, less than 0.3 mm, less than 0.1 mm, or less than 0.05 mm across the lateral and/or longitudinal extents of the body 110 of the shim 108. However, in alternative embodiments, the vertical extent of the body may vary (e.g., along the longitudinal extent and/or along the lateral extent of the shim body). Furthermore, in the illustrated embodiment, each recess extends entirely through the body 110 along the vertical axis 53.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A shim for a work vehicle axle assembly, comprising:
a body having a substantially constant extent along a vertical axis and a first recess extending entirely though the body along the vertical axis, wherein the first recess is configured to receive a shaft of a first fastener extending between a kingpin cap of the work vehicle axle assembly and a spindle, the first recess has a fastener-receiving portion and an inlet portion extending from the fastener-receiving portion of the first recess, a diameter of the fastener-receiving portion of the first recess is configured to be substantially equal to a diameter of the shaft of the first fastener, and a width of the inlet portion of the first recess is configured to be less than the diameter of the shaft of the first fastener.

2. The shim of claim 1, wherein the inlet portion of the first recess has a substantially flat side and an arcuate side, and a distance between the substantially flat side of the inlet portion of the first recess and a peak of the arcuate side of the inlet portion of the first recess establishes the width of the inlet portion of the first recess.

3. The shim of claim 2, wherein a curvature of a segment of the arcuate side of the inlet portion of the first recess substantially matches a curvature of the fastener-receiving portion of the first recess.

4. The shim of claim 1, wherein the body has a second recess, the second recess is configured to receive a shaft of a second fastener extending between the kingpin cap of the work vehicle axle assembly and the spindle, the second recess has a fastener-receiving portion and an inlet portion extending from the fastener-receiving portion of the second recess, a diameter of the fastener-receiving portion of the second recess is configured to be substantially equal to a diameter of the shaft of the second fastener, and a width of the inlet portion of the second recess is configured to be less than the diameter of the shaft of the second fastener.

5. The shim of claim 4, wherein the inlet portion of the second recess has a substantially flat side and an arcuate side, and a distance between the substantially flat side of the inlet portion of the second recess and a peak of the arcuate side of the inlet portion of the second recess establishes the width of the inlet portion of the second recess.

6. The shim of claim 5, wherein the inlet portion of the first recess has a substantially flat side and an arcuate side, and a distance between the substantially flat side of the inlet portion of the first recess and a peak of the arcuate side of the inlet portion of the first recess establishes the width of the inlet portion of the first recess.

7. The shim of claim 6, wherein the arcuate side of the inlet portion of the first recess is positioned laterally outward from the substantially flat side of the inlet portion of the first recess, and the arcuate side of the inlet portion of the second recess is positioned laterally outward from the substantially flat side of the inlet portion of the second recess.

8. A shim for a work vehicle axle assembly, comprising:
a body having a first recess, wherein the first recess is configured to receive a shaft of a first fastener extending between a kingpin cap of the work vehicle axle assembly and a spindle, the first recess has a fastener-receiving portion and an inlet portion extending from the fastener-receiving portion of the first recess, a diameter of the fastener-receiving portion of the first recess is configured to be substantially equal to a diameter of the shaft of the first fastener, and a width of the inlet portion of the first recess is configured to be less than the diameter of the shaft of the first fastener;
wherein the inlet portion of the first recess has a substantially flat side and an arcuate side, and a distance between the substantially flat side of the inlet portion of the first recess and a peak of the arcuate side of the inlet portion of the first recess establishes the width of the inlet portion of the first recess.

9. The shim of claim 8, wherein a curvature of a segment of the actuate side of the inlet portion of the first recess substantially matches a curvature of the fastener-receiving portion of the first recess.

10. The shim of claim 8, wherein the body has a second recess, the second recess is configured to receive a shaft of a second fastener extending between the kingpin cap of the work vehicle axle assembly and the spindle, the second recess has a fastener-receiving portion and an inlet portion extending from the fastener-receiving portion of the second recess, a diameter of the fastener-receiving portion of the second recess is configured to be substantially equal to a diameter of the shaft of the second fastener, and a width of the inlet portion of the second recess is configured to be less than the diameter of the shaft of the second fastener.

11. The shim of claim 10, wherein the inlet portion of the second recess has a substantially flat side and an arcuate side, and a distance between the substantially flat side of the inlet portion of the second recess and a peak of the arcuate side of the inlet portion of the second recess establishes the width of the inlet portion of the second recess.

12. The shim of claim 11, wherein a curvature of a segment of the actuate side of the inlet portion of the second recess substantially matches a curvature of the fastener-receiving portion of the second recess.

13. The shim of claim 11, wherein the arcuate side of the inlet portion of the first recess is positioned laterally outward from the substantially flat side of the inlet portion of the first recess, and the arcuate side of the inlet portion of the second recess is positioned laterally outward from the substantially flat side of the inlet portion of the second recess.

14. A shim for a work vehicle axle assembly, comprising:
a body having a first recess and a second recess;
wherein the first recess is configured to receive a shaft of a first fastener extending between a kingpin cap of the work vehicle axle assembly and a spindle, the first recess has a fastener-receiving portion and an inlet portion extending from the fastener-receiving portion of the first recess, and a diameter of the fastener-receiving portion of the first recess is configured to be substantially equal to a diameter of the shaft of the first fastener;
wherein the second recess is configured to receive a shaft of a second fastener extending between the kingpin cap of the work vehicle axle assembly and the spindle, the second recess has a fastener-receiving portion and an inlet portion extending from the fastener-receiving portion of the second recess, a diameter of the fastener-receiving portion of the second recess is configured to be substantially equal to a diameter of the shaft of the second fastener, and a width of the inlet portion of the second recess is configured to be less than the diameter of the shaft of the second fastener; and
wherein an inlet axis of the inlet portion of the first recess is angled relative to an inlet axis of the inlet portion of the second recess.

15. The shim of claim 14, wherein the inlet axis of the inlet portion of the second recess is substantially parallel to a longitudinal axis of the body.

16. The shim of claim 14, wherein an opening to the inlet portion of the first recess is positioned laterally closer to the second recess than the fastener-receiving portion of the first recess.

17. The shim of claim 14, wherein the inlet portion of the second recess has a substantially flat side and an arcuate side, and a distance between the substantially flat side of the inlet portion of the second recess and a peak of the arcuate side of the inlet portion of the second recess establishes the width of the inlet portion of the second recess.

18. The shim of claim 17, wherein a curvature of a segment of the actuate side of the inlet portion of the second recess substantially matches a curvature of the fastener-receiving portion of the second recess.

19. The shim of claim 17, wherein the arcuate side of the inlet portion of the second recess is positioned laterally outward from the substantially flat side of the inlet portion of the second recess.

20. The shim of claim 14, wherein the body has a tab positioned closer to the second recess than the first recess, and the tab is configured to facilitate removal of the shim from the first and second fasteners.

* * * * *